Oct. 7, 1941.                W. J. BRETH                2,257,898
                               CHUCK
                         Filed Jan. 16, 1939          2 Sheets-Sheet 1
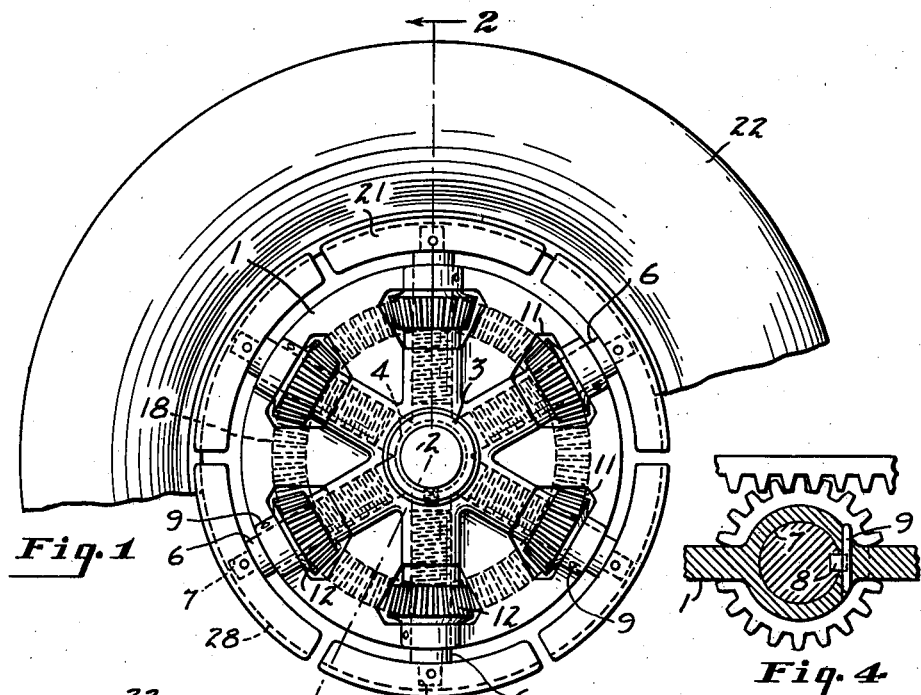
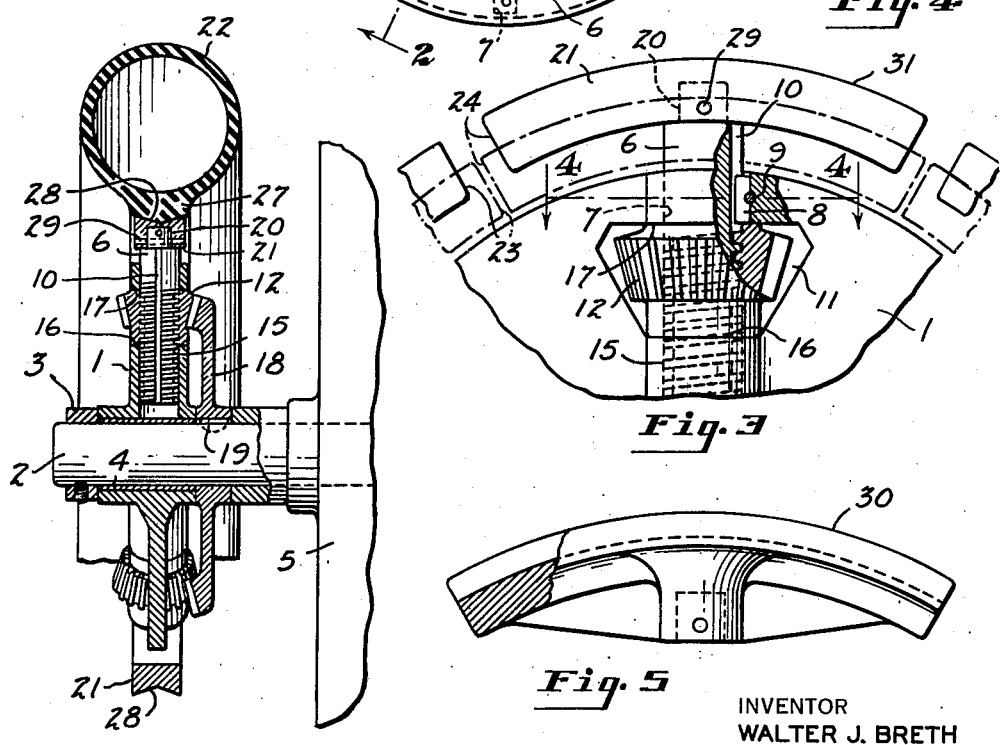
INVENTOR
WALTER J. BRETH
BY
ATTORNEYS Oct. 7, 1941. W. J. BRETH 2,257,898
CHUCK
Filed Jan. 16, 1939 2 Sheets-Sheet 2

INVENTOR
WALTER J. BRETH
BY
ATTORNEYS

Patented Oct. 7, 1941

2,257,898

UNITED STATES PATENT OFFICE 2,257,898

CHUCK

Walter J. Breth, Akron, Ohio, assignor to The General Tire & Rubber Company, Akron, Ohio, a corporation of Ohio Application January 16, 1939, Serial No. 251,198

5 Claims. (Cl. 154—9)

This invention relates to apparatus for holding and rotating annular bodies, more particularly to a chuck for mounting and rotating a pneumatic annulus such as a pneumatic vehicle tire or an air bag for use in the vulcanization of pneumatic tires.

It is an object of the invention to provide an apparatus of the character mentioned, having means for engaging the inner periphery of an annulus at a plurality of successive areas and to automatically retain the annulus during rotation of the latter.

Another object is to provide a chuck or mounting apparatus for an annulus which is provided with a plurality of radially extending legs which receive the annulus and which legs are under a radial thrust exerted by the driving force imparted to the chuck to rotate the latter.

Another and more specific object is to provide an apparatus for mounting and rotating annular bodies which has a number of sets of foot elements which engage the annular body to be mounted and rotated and can be interchanged and alternated in use as desired, to adapt the apparatus for annuli of different size. Other objects and advantages will become apparent from the following detailed description of a suitable embodiment of the invention made in connection with the accompanying drawings, in which:

Figure 1 is an elevational view, with parts removed, showing a chuck for mounting an air bag, constructed in accordance with the principles of the present invention, the air bag being such as is used in the vulcanization of pneumatic tires and only partially shown;

Fig. 2 is a sectional view, with parts removed, taken substantially on the line 2—2 of Fig. 1;

Fig. 3 is an enlarged fragmentary elevational view showing the construction of one of the radially movable legs and the associated felly member or foot element;

Fig. 4 is a sectional detail taken substantially on the line 4—4 of Fig. 3;

Fig. 5 is an elevational view, with parts broken away, of a modified form of felly or foot element;

Figure 6:
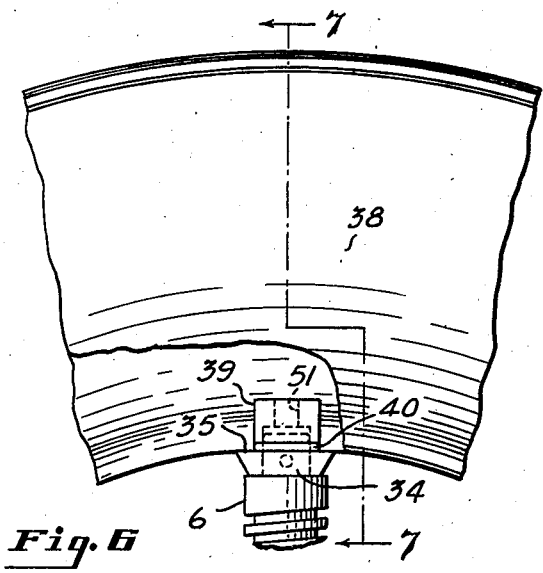
Fig. 6 is a fragmentary elevational view, with parts broken away, showing a modified form of foot element to be employed when the apparatus of the present invention is used for mounting and rotating a pneumatic tire.

In the rubber tire and related manufacturing industries there are numerous operations where it is desirable or necessary to mount an annulus of one character or another for the purpose of working on the same while it is stationary or while it is rotating, at a relatively high rate of speed. For example, in cleaning, dressing or resurfacing air bags, as they are called, which are used to inflate pneumatic tires during vulvanization of the latter, the air bags are rotated in the manner of a wheel and an operator performs certain operations on the rotating annular surface thereof. Again, in retreading or recapping tires it is desirable to remove portions of the old tread rubber and otherwise prepare the tire for the application thereto of the new tread rubber. Certain of the dressing operations can be performed to advantage if the tire is mounted and other operations require that the tire be rotated at a relatively high velocity. It will be apparent that in large plants where a great many air bags or tires are to be treated in the same fashion it becomes of considerable importance to reduce the time necessary for mounting and demounting each annular body on the chuck or device used for rotating the same. Previously, devices used for mounting and rotating pneumatic tires and the like, were so constructed that the operator was required to perform some special manipulation in order to lock the tire or air bag in place. Also, after the desired operations had been performed on the air bag or tire, it was necessary to manipulate the chuck or mounting device in some manner after it had been stopped in order to release the annulus therefrom.

By the present invention an apparatus is provided which automatically locks the annulus in place upon slight rotation of the device and releases the annulus when the driving shaft for returning the chuck is stopped.

Referring to the drawings by numerals of reference which indicate like parts throughout the several views, the invention will now be described in greater detail as applied to a chuck of the radial expanding type. The apparatus comprises a rotatable member or spider 1 carried by a driven shaft 2 being retained thereon by means of a suitable collar 3. The member 1 is loose or free on the shaft 2 for rotation with respect thereto and preferably rides on an anti-friction bushing or bearing 4. The shaft 2 is journalled in a standard 5 which may be part of any apparatus with which the chuck is to be employed or may be merely a means for supporting the chuck independent of any related apparatus. Suitable drive means, such as an electric motor (not shown), is provided for actuating the shaft 2 and is equipped with stopping and starting control means of conventional character. A plurality of radially disposed rods or leg members 6 are slidably carried by the spider 1 in spaced relation with respect to one another. Preferably the rods or legs 6 are slidably mounted in sockets or bores 7 formed in the spider 1. The spider 1 may be formed of one or more pieces. In the event that it is an integral casting as shown, the bores or sockets 7 may be formed during the casting operation by suitable cores, or by drilling.

The leg members 6 are radially slidable in the sockets 7 and secured against rotation about their longitudinal axes by keys 8 secured in outer portions of the sockets by means of pins 9. The keys 8 ride in axial grooves 10 formed in the rods or leg members 6.

The spider 1 is apertured or cut away in the region of each of the sockets to provide gear cages 11 which receive bevel gears 12 threadedly mounted on threaded portions 15 of the leg members 6. Abutments 16 and 17 of the gear cages 11 engage end portions or shoulders of the gears 12 to restrain axial movement of the latter so that upon rotation of the gears the leg members or rods 6 are projected or retracted depending upon the direction of rotation of the gears.

A ring gear 18 is mounted on the driven shaft 2 adjacent the spider 1 and secured against rotation by a key 19. This gear meshes with all of the bevel gears 12 so that upon rotation of the ring gear 18 relative to the spider 1 all of the bevel gears 12 are synchronously rotated in the same relative direction so as to simultaneously project or retract all of the leg members 6.

Mounted on reduced diameter portions 20 of each of the legs 6 is an arcuate felly or foot element 21. These elements are in effect segments of a circular felly which engages substantially the entire inner periphery of an annulus to be rotated by the device such, for example, as an air bag 22. Each of the felly elements is of a sufficient length so that when the leg members 6 are completely retracted, end 23 of one felly element is relatively close to end 24 of the next adjacent felly element, as indicated by the broken lines of Fig. 3.

In mounting the air bag 22 or other annulus on the chuck it is placed so that the inner periphery thereof, which is usually in the form of a thickened bead 27, rests on one or more of the uppermost felloes or foot elements and seats in a circumferential concavity or V-shaped groove 28 formed in the outwardly directed surface of each of the foot elements. Preferably, pins 29 secure the felloes or foot elements on the spokes or legs 6 and prevent rotation of the foot elements so as to maintain them in circumferential alignment with one another. The shaft 2 is then actuated by the driving mechanism so as to rotate the ring gear 18. The ring gear then simultaneously rotates all of the bevel gears 12 so that the latter screw the legs or spokes 6 outwardly to increase the effective diameter of the gears opposite foot or felly elements which engage the bead 27 of the air bag 22 about substantially the entire inner periphery thereof. Upon engagement of the foot elements 21 with the bead of the air bag, further radial movement of the legs or spokes 6 is arrested and the bevel gears 12 are locked against rotation by engagement with the abutments 16. Continued rotation of the driven shaft 2 and ring gear 18 then drives the spider or rotatable member 1 through the locked bevel gears 12. Thus the air bag 22 is automatically locked or secured on the chuck during rotation of the latter.

After the completion of the finishing or trimming operation on the air bag the power drive is released from the driven shaft 2 and a braking action applied which is transmitted to the ring gear 18. The inertia of the air bag 22 and the spider or rotatable member 1 continues to rotate the latter which results in a reverse rotation of the bevel gears 12, retracting the legs or spokes 6 which disengages the foot elements or felloes 21 from the bead 27 of the air bag. Thus upon stopping the shaft 2 the air bag is automatically disconnected or unlocked from the chuck. Hence the rotating device of the present invention may be loaded and unloaded merely by placing the annulus to be rotated on the felly elements and actuating the shaft 2, then stopping the shaft 2 and lifting the annulus from the contracted felly elements.

In Fig. 5 is illustrated a felly element of the character employed when the device is to be used for mounting or rotating air bags or other annuli relatively larger than that shown in Figs. 1 and 2. This felly element has a relatively greater circumferential curvature along its annulus engaging surface 30 than that of the felly element shown in Fig. 3, which has a relatively small circumferential curvature along its annulus-engaging surface 31. Also, the socket part of the felly or foot element of Fig. 5 has a relatively deeper radial thickness than the socket part of the felly or foot element of Fig. 3 to give a greater effective diameter to the device.

Figure 7:
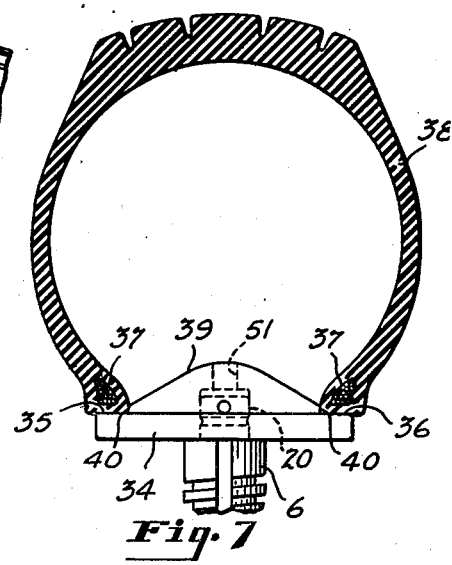
Fig. 7 is a sectional view, with parts removed, taken substantially on the line 7—7 of Fig. 6.

When using the rotating mechanism of the present invention for mounting pneumatic vehicle tires, foot elements of the character shown in Figs. 6 and 7 are employed. These elements have a greater axial length than circumferential length and are secured on the reduced diameter end portions of the legs or spokes 6, preferably at a central portion of the foot elements. At opposite ends of body 34 are abutments 35 and 36 for receiving annular circumferential beads 37 of a pneumatic tire 38 to be mounted on the device. An upstanding dome or crown 39 is formed on the body 34 between the abutments 35 and 36 and is normally disposed between the beads 37 and internally of the tire being rotated. Shoulders 40 are formed at the ends of the dome 39 adjacent the abutments 35 and 36 to engage the inside edges of the beads 37.

In mounting a pneumatic tire on the expandable chuck the procedure is similar to that previously described in connection with the air bag 22. When the legs or spokes 6 are retracted and a tire is placed on the device so that it rests on the uppermost of the foot elements 34, the beads 37 of the tire seat themselves on the abutments 35 and 36 when the foot elements are distended. This seating action results from the sloping or crowned construction of the central portion 39 of each of the foot elements, which causes the beads 37 to slide thereover until they rest on the abutments at the edges of the foot elements.

Figure 8:
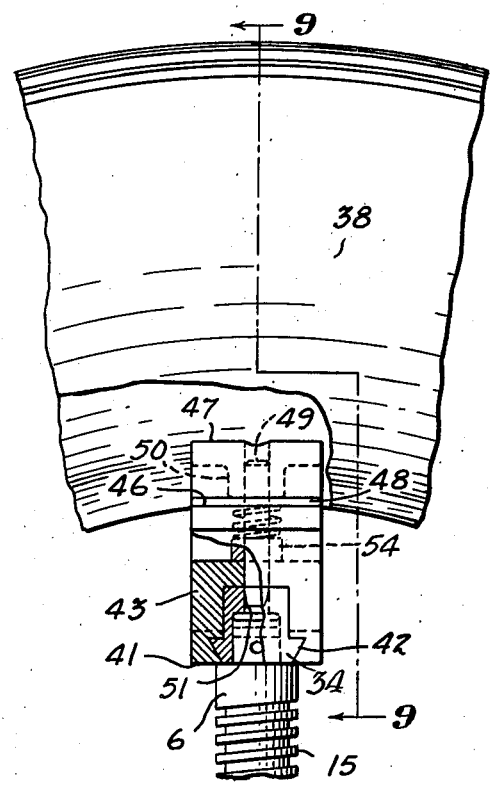
Fig. 8 is an elevational view, partly in section and with parts removed, showing a supplemental or extension foot element to be employed when the apparatus is used for mounting and rotating a pneumatic tire of larger diameter than that shown in Fig. 6.
Figure 9:
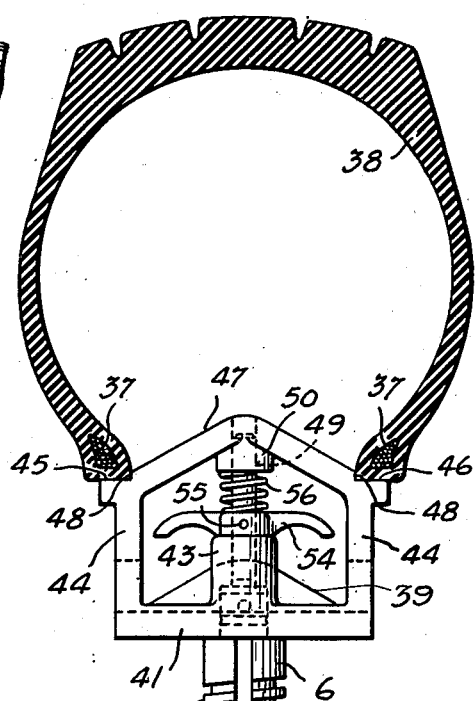
Fig. 9 is a sectional view taken substantially on the line 9—9 of Fig. 8.

It is contemplated to provide each of the chucks or mounting devices with a supplementary or second set of foot elements such as those illustrated in Figs. 8 and 9 which are to be used in conjunction with the first or primary set of foot elements shown in Figs. 6 and 7. The supplementary foot elements are for use when mounting tires of relatively large size, and serve, in effect, as extensions of the footing elements 34.

Each of the supplementary foot elements comprises a body portion 41 which is provided with a dovetail sliding connection 42 with the body portion 34 of the primary foot element. The body portion 41 is slidable axially with respect to the body portion 34 of the primary foot element and has a central portion 43 which embraces the crown or dome 39 of the primary foot element. Extension members 44 are formed on the body 41 in spaced relation with respect to one another and are surmounted by abutments 45 and 46 which correspond to the abutments 35 and 36 previously described, for receiving the beads 37 of a tire 38.

A crown or raised portion 47 extends between the abutments 45 and 46 between the beads 37 of the tire and at its ends is formed with shoulders 48 corresponding to the shoulders 40 of the crown 39. A rod or pin 49 is slidably mounted an enlarged portion 50 formed at the central part of the crown 47 intermediate the abutments 45 and 46. This rod extends through a bore in the central part 43 of the supplementary foot element and seats in a socket 51 formed in the crown 39 of the primary footing element, thus latching or locking the elements together and preventing lateral or axial sliding movement of the secondary foot element with respect to the primary footing element. A cross piece 54 is secured on the rod 49 by a pin 55 and a compression spring 56 is carried on the rod 49 between the cross piece 54 and the enlarged portion 50 of the crown 47. Thus the spring 56 normally urges the latch rod 49 toward the central part 43 of the supplementary foot element and into locking engagement with the primary foot element. The cross member 54 serves as a finger hold for the operator when retracting the latch rod 49 to remove the supplementary foot element.

The present invention thus provides a chuck for mounting an annulus which automatically engages the annulus and locks it in position prior to the rotation thereof, and, after the operation or process to be performed on the rotating annulus is completed, is arranged to automatically release the annulus upon arresting the rotation of the shaft on which the chuck is mounted. Interchangeable sets of felloes or foot elements are provided for use in combination with a single spider or rotatable member, and in the case of foot elements for mounting pneumatic tires the secondary foot elements are employed in combination with primary foot elements so as to quickly adapt the chuck or mounting device for tires of different size.

Other modes of utilizing the principles of the present invention may be resorted to change being made in the details of construction as desired, it being understood that the embodiments of the invention set forth above and shown in the drawings are given for purposes of illustration and description, numerous alterations and substitutions of parts being contemplated.

What I claim is:

1. In an apparatus for rotatably supporting a tire, and having a rotatable member and a plurality of rods adapted to be projected from the rotatable member, elements on the rods for engaging the beads of a tire, said elements being of greater axial than circumferential extent relative to the rotatable member, and each having an upstanding tapered dome of less length than the element to provide abutments on the ends of the elements which receive the beads of a tire, and the sides of the dome serving to guide the beads onto the abutments as the rods are projected.

2. In an apparatus for rotatably supporting a tire, and having a rotatable member and a plurality of rods adapted to be projected from the rotatable member, a first set of elements secured on the rods for engaging the beads of a tire, said elements having elongated body portions and raised central portions of less length and width than the body portions, and with sloping sides, the ends of the elements beyond the central portions forming abutments to receive the beads of a tire, and a second set of tire carrying elements, each slidably received over an element of the first set in interfitting relation therewith, said elements of the second set being arranged to individually straddle the raised portions of the first set of elements and individually having portions in bearing engagement with the bodies of the first set of elements on opposite sides of the straddle raised portions.

3. In an apparatus for rotatably supporting a tire, and having a rotatable member and a plurality of rods adapted to be projected from the rotatable member, a first set of elements secured on the rods for engaging the beads of a tire, said elements having elongated body portions and raised central portions of less length and width than the body portions, and with sloping sides, the ends of the elements beyond the central portions forming abutments to receive the beads of a tire, a second set of tire carrying elements, each slidably received over an element of the first set in interfitting relation therewith, said elements of the second set being arranged to individually straddle the raised portions of the first set of elements and individually having portions in bearing engagement with the bodies of the first set of elements on opposite sides of the straddled raised portions, and spring-actuated locking means carried by the elements of the second set and engageable with the elements of the first set to prevent relative sliding between the elements.

4. A tire support comprising a rotatable spider member having a plurality of elongated leg members mounted thereon for approximately radial movement with respect to the rotational axis of the spider, means for simultaneously shifting all the leg members to project the ends thereof radially beyond the spider, and foot elements for retaining a tire on the ends of the leg members, said elements each having means in its radially inner side for attaching the same to one of the leg elements and having on its radially outer side a tapered dome, the domes being of less extent than the foot elements to provide a pair of spaced abutments disposed on opposite sides of each dome for receiving the beads of a tire mounted on the support, each pair of abutments being equally spaced so that the beads of a mounted tire are maintained in parallelism.

5. A tire support comprising a rotatable spider member having a plurality of elongated leg members mounted thereon for approximately radial movement with respect to the rotational axis of the spider, means for simultaneously shifting all the leg members to project the ends thereof radially beyond the spider, a first foot element on the outer end of each leg member, said elements each having means on its radially inner side for attaching the same to the outer end of one of the leg members, a second foot element mounted on each first foot element and extending radially beyond the latter, said first and second foot elements having interfitting engagement with one another for relative sliding movement in a direction parallel to the rotational axis of the spider member, and a pin mounted in one of the foot elements on each leg member for radial movement and being engageable with the other foot element on such leg member to lock the elements together.

WALTER J. BRETH.